(12) United States Patent
Burger et al.

(10) Patent No.: US 11,809,945 B2
(45) Date of Patent: Nov. 7, 2023

(54) APPARATUS FOR MARKING A COMPONENT BY APPLYING READABLE IDENTIFYING INFORMATION

(71) Applicant: Bayerische Motoren Werke Aktiengesellschaft, Munich (DE)

(72) Inventors: Felix Burger, Regensburg (DE); Bernhard Glueck, Fuerstenfeldbruck (DE); Robert Kirschner, Olching (DE); Mario Meinhardt, Munich (DE); Peter Soell, Bodenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/796,929

(22) PCT Filed: Feb. 10, 2021

(86) PCT No.: PCT/EP2021/053154
§ 371 (c)(1),
(2) Date: Aug. 2, 2022

(87) PCT Pub. No.: WO2021/175545
PCT Pub. Date: Sep. 10, 2021

(65) Prior Publication Data
US 2023/0059129 A1     Feb. 23, 2023

(30) Foreign Application Priority Data
Mar. 4, 2020   (DE) .................. 10 2020 105 732.6

(51) Int. Cl.
*G06K 7/10*     (2006.01)
*G06K 19/06*    (2006.01)

(52) U.S. Cl.
CPC ... *G06K 7/10712* (2013.01); *G06K 19/06046* (2013.01)

(58) Field of Classification Search
CPC ...... G06K 7/1012; G06K 19/00; G06K 19/04; G06K 19/06; G06K 19/06046
(Continued)

(56) References Cited

U.S. PATENT DOCUMENTS 4,275,652 A   6/1981   Bo
4,894,619 A   1/1990   Leinonen et al.
(Continued)

FOREIGN PATENT DOCUMENTS

DE   28 17 640 A1   11/1978
DE   43 06 209 A1    9/1994
(Continued)

OTHER PUBLICATIONS

International Search Report (PCT/ISA/210) issued in PCT Application No. PCT/EP2021/053154 dated Apr. 21, 2021 with English translation (seven (7) pages).
(Continued)

*Primary Examiner* — Edwyn Labaze
(74) *Attorney, Agent, or Firm* — Crowell & Moring LLP

(57) ABSTRACT

An apparatus for marking a component by applying readable identifying information is provided. The identifying information has at least one identifying feature, in particular an identifying symbol. The apparatus includes a detection device which is designed to detect, on the basis of an eddy current measurement, identifying information applied or to be applied to a component by way of the apparatus.

9 Claims, 1 Drawing Sheet

(58) Field of Classification Search
USPC .......................................... 235/380, 375, 487
See application file for complete search history.

(56) References Cited

U.S. PATENT DOCUMENTS

| | | | |
|---|---|---|---|
| 4,978,917 | A | 12/1990 | Goldenfield et al. |
| 6,068,102 | A | 5/2000 | Kawase |
| 10,549,347 | B2 | 2/2020 | Gold et al. |
| 2004/0011462 | A1* | 1/2004 | Gotkis ................. B24B 49/105 438/692 |
| 2004/0173434 | A1 | 9/2004 | Morita et al. |
| 2015/0344266 | A1 | 12/2015 | Inoue et al. |
| 2016/0349213 | A1* | 12/2016 | Kollgaard .......... G01N 27/9073 |
| 2019/0389031 | A1* | 12/2019 | Nakamura ............ B24B 49/105 |
| 2020/0218237 | A1 | 7/2020 | Ottnad et al. |
| 2020/0311363 | A1 | 10/2020 | Bossert et al. |
| 2022/0126597 | A1 | 4/2022 | Glueck |

FOREIGN PATENT DOCUMENTS

| | | | | |
|---|---|---|---|---|
| DE | 10 2004 001 464 A1 | 7/2004 | | |
| DE | 10 2008 039 376 A1 | 2/2010 | | |
| DE | 10 2017 218 692 A1 | 4/2019 | | |
| DE | 102017218692 A1 * | 4/2019 | ............... | G06K 1/12 |
| DE | 10 2019 106 751 A1 | 7/2019 | | |
| WO | WO-9916092 A1 * | 4/1999 | ........... | H01F 27/245 |
| WO | WO 2019/048260 A1 | 3/2019 | | |

OTHER PUBLICATIONS

German-language Written Opinion (PCT/ISA/237) issued in PCT Application No. PCT/EP2021/053154 dated Apr. 21, 2021 (six (6) pages).

German-language Search Report issued in German Application No. 10 2020 105 732.6 dated Apr. 29, 2021 with partial English translation (11 pages).

\* cited by examiner

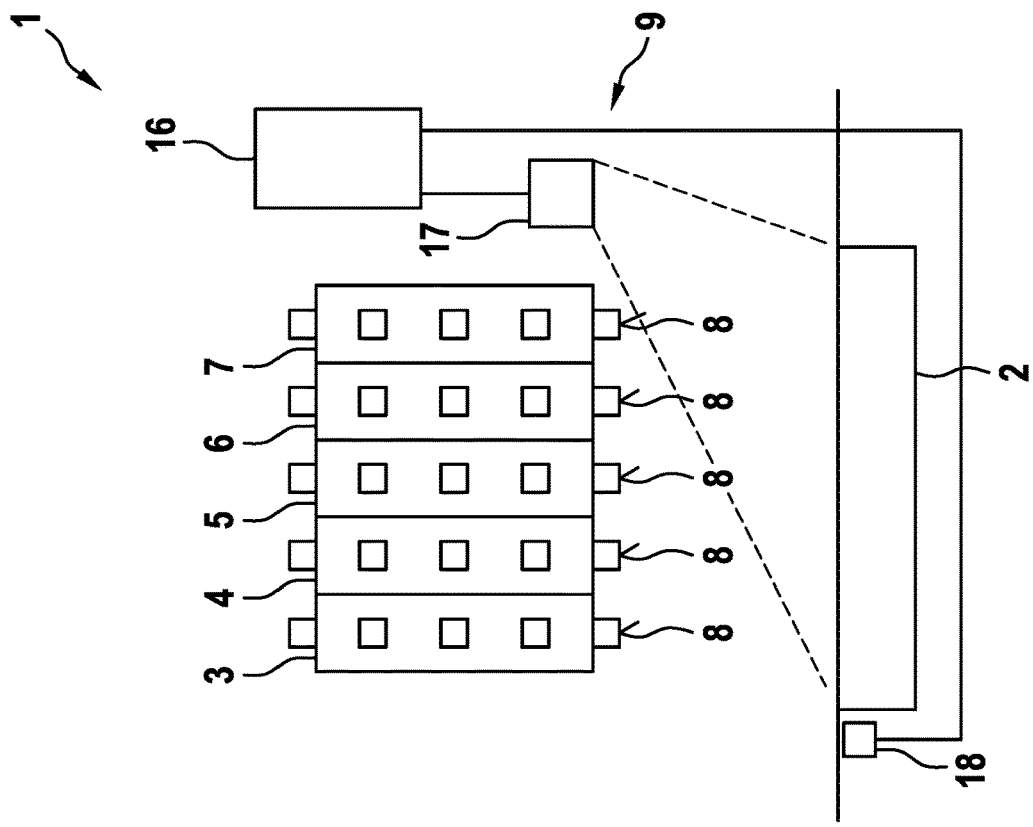
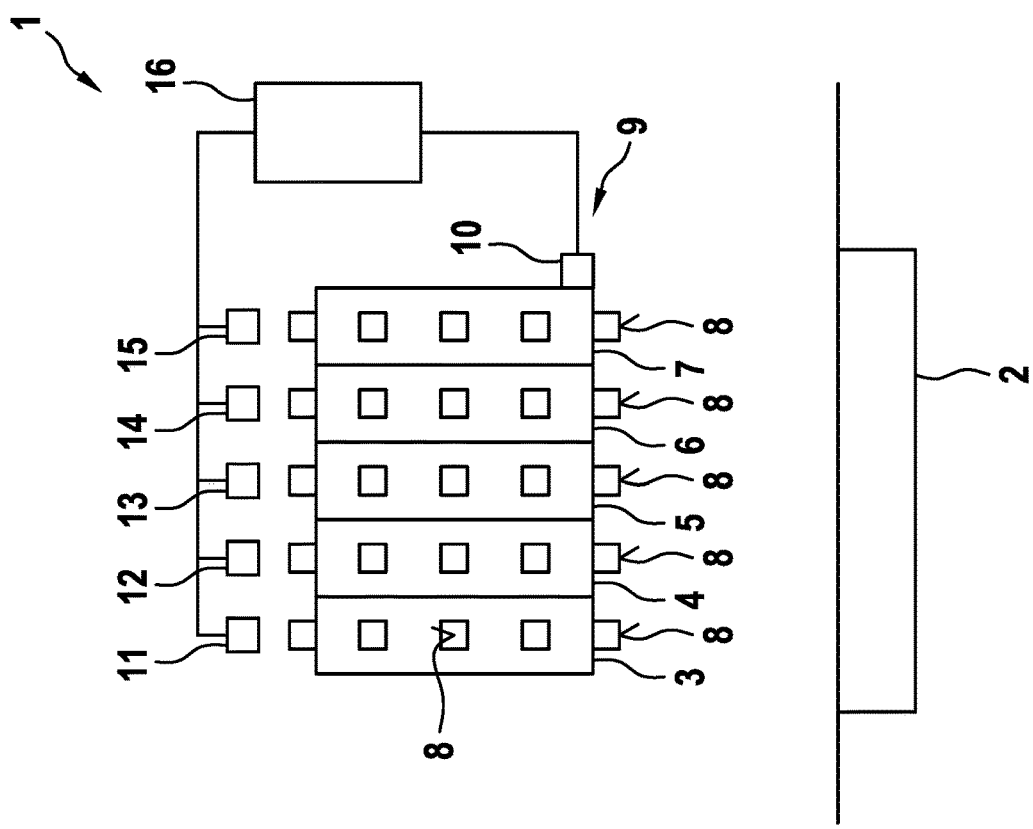

APPARATUS FOR MARKING A COMPONENT BY APPLYING READABLE IDENTIFYING INFORMATION

BACKGROUND AND SUMMARY OF THE INVENTION

The invention relates to an apparatus for marking a component by applying readable identifying information, the identifying information comprising at least one identifying feature, in particular an identifying symbol.

Such apparatuses for marking a component are fundamentally known from the prior art, for example in the form of counter stamps. Such apparatuses may be used to mark components by applying readable identifying information to the components. By way of example, identification of the component may be achieved by applying the identifying information, for example a serial number. The serial number allows an association to be made with specific manufacturing processes or batches, with the result that it is possible to determine, among other things, when and where the relevant component was manufactured.

Such apparatuses have hitherto not been able to link information that is fundamentally known for the component, for example detailed information about the manufacturing process, the material and the like, with the identifying information embossed at the end of the manufacturing process. It is merely known practice to engrave or stamp identifying information into the component at the beginning of the manufacturing process. Taking the example of a counter stamp, identifying information is stamped into the component by embossing a defined serial number. Such counter stamps are not currently equipped with an appropriate sensor system permitting the manufactured component to be linked with the identifying information, however. In other words, the identifying information cannot subsequently be used to draw an exact conclusion about specifically which component was manufactured at which time; the component may only be associated with a batch concerning the current process step. If in particular variations or divergences in the manufacturing process arise within a batch, it is generally necessary to process or dispose of all of the components to be associated with this batch, since it is not possible to resolve the components more accurately with respect to the individual manufacturing processes for the individual components.

The invention is therefore based on the object of specifying a contrastingly improved apparatus for marking components that in particular allows linking of information relating to a component.

The object is achieved by way of an apparatus having the features of the claimed invention.

As described above, the invention relates to an apparatus for marking a component by applying readable identifying information. The identifying information comprises at least one, normally a plurality of, identifying feature(s). The identifying features are normally identifying symbols, for example alphanumeric characters, specifically digits that produce a serial number. By embossing the identifying information individual to the component, it is possible to distinguish the component from other components of identical design. The invention is based on the insight that the apparatus may be assigned a detection device that is designed to detect, on the basis of an eddy current measurement, identifying information applied or to be applied to a component by way of the apparatus.

The eddy current measurement permits detection of the identifying information that has been applied or is applied to the component by way of the apparatus. In other words, the apparatus is used to mark the component by applying identifying information to the component. The detection device may be used to detect the identifying information on the basis of an eddy current measurement. In other words, the detection device is used to detect which identifying information has been introduced into the component or has been applied to the component. Alternatively, the identifying information may also be detected before being applied, for example on the basis of a feature of the apparatus, specifically on the basis of a current setting of the apparatus.

Detection of the identifying information ultimately allows a correlation to be made between the individual component and its identifying information, and the identifying information to be stored in a memory device of the apparatus if necessary. The eddy current measurement may be used in particular to detect the identifying information that is or has been introduced into the component or applied to the component, with the result that the identifying information may subsequently be stored in a database or a memory device of the apparatus. This further permits information that is already known about the individual components, for example concerning prior manufacturing steps, to be forwarded to further stations in the process chain. If previously applied identifying information, for example engraved into the component, is overpainted, for example, the information relating to this component may be transferred and linked with the new identifying information applied by way of the apparatus for marking the component. This makes it possible to prevent information relating to a component from being lost during the process chain.

This is achieved by using the detection device to detect the identifying information applied to mark the component. Since not only is the identifying information therefore applied to the component, as is customary in the prior art, but rather the application or the identifying information itself is also detected, aside from the marking of the component it is possible to make a link with information that is known about the component. This permits in particular accurate identification of these components in the event of a divergence in the manufacturing process that concerns not the whole batch but rather only individual components.

According to one development of the apparatus, there may be provision for the apparatus to be designed to apply the identifying information by way of at least one stamping device, in particular by way of a counter stamp, or by way of a beam of energy. In principle, it is possible to apply the identifying information to the component in any manner so long as the identifying information is subsequently able to be detected by way of the eddy current measurement. In principle, it is also not necessary to detect the identifying information on the component itself. Alternatively, indirect detection by way of the eddy current measurement may be performed, for example the identifying features on a stamp of a stamping device that are introduced into or applied to the component may be detected.

The detection device may comprise at least one eddy current sensor arranged in a portion of the apparatus that comprises at least one stamping device. The at least one sensor may therefore be arranged in the portion of the apparatus in which the at least one stamping device is arranged or accommodated. In particular, the stamping element that ultimately brings about the change in material in the component, and therefore applies the identifying information to the component, may be arranged in the portion of the apparatus in which the at least one eddy current sensor is arranged. If for example the component is processed by the stamping device "from above", that is to say that the identifying information is stamped onto the component "from above", then the eddy current sensor may be arranged in this "upper" tool half or the corresponding tool portion of the apparatus. This permits the identifying information not to be detected, or at least not to be detected exclusively, in the component itself, but rather the stamping device itself may be detected by way of the eddy current sensor in order to ascertain which identifying information is introduced into or applied to the component.

The stamping device described may in particular comprise at least two stamping elements, for example stamping wheels that can rotate about an axis of rotation into multiple positions, the detection device being able to be designed to detect information relating to a stamp symbol to be stamped into the component by way of the at least two stamping elements, in particular a position and/or an orientation of the at least two stamping wheels. As described above, the identifying information normally comprises multiple identifying features, for example identifying symbols in the form of alphanumeric characters. In this regard, the stamping device comprises a corresponding number of stamping elements in order to stamp the applicable identifying information into the component.

For example, the stamping elements may be in the form of rotatable stamping wheels, with the result that, depending on which identifying information is intended to be set up, a corresponding position of the individual stamping wheels is obtained. If for example a continuous serial number in the components that are intended to be marked by way of the apparatus is used to mark the components, the serial number may be stamped into the component by way of the individual appropriately selected or positioned stamping elements, for example by way of the rotatable stamping wheels. The detection device is able to detect the respective position of the individual stamping elements, or of the individual stamping wheels, and therefore to produce the connection between the component and the identifying information.

At least one eddy current sensor may be associated with at least two stamping elements, and/or at least two different eddy current sensors may be associated with at least two different stamping elements. Accordingly, there may be provision for two or more stamping elements to be able to be detected by way of the same eddy current sensor. In particular, a specific combination of information stamped into the component by way of two or more stamping elements may be detected by way of the same eddy current sensor. Alternatively or additionally, it is likewise possible for different eddy current sensors to be associated with individual stamping elements, in particular in order to detect exclusively the identifying features thereof or to detect which identifying features are embossed by way of the individual stamping elements.

In other words, it is possible to provide for one eddy current sensor per stamping element or it is likewise possible to use one eddy current sensor for multiple stamping elements. Based on the mechanism of action of the eddy current measurement, this permits the characteristics of the identifying information made up of the individual stamping elements to be detected either individually or in combination. If the individual stamping elements are in the form of stamping wheels, for example, and are arranged beside one another in such a way that an eddy current measurement can be performed through the individual stamping elements, it is likewise possible to use one eddy current sensor to detect the individual stamping elements, specifically the present orientation thereof, simultaneously. Similarly, it is possible to produce interspaces between the individual stamping elements, in which individual eddy current sensors are accommodated, which in turn detect only the individual stamping elements. The eddy current sensors may also be arranged otherwise, however, without the need to provide for interspaces between the stamping elements, for example radially in relation to the stamping elements. Appropriate combinations are naturally possible.

Furthermore, the individual eddy current sensors may also be arranged with respect to the at least one stamping element in such a way that the identifying information applied to the component by way of the stamping element is detected indirectly. In this regard, at least one eddy current sensor may be in particular arranged at an angle with respect to a stamping surface of the stamping elements. Furthermore, the eddy current sensors may be arranged oppositely with respect to the stamping element. If the identifying information is embossed by way of stamping wheels, for example, an eddy current sensor may be arranged opposite the stamping surface that is currently embossing the identifying feature into the component. In other words, the stamping surfaces arranged in a manner distributed on the stamping wheels so as to circulate in the circumferential direction may be rotated in order to be able to set the particular applicable combination of identifying features that together form the identifying information. It is therefore possible for the stamping surface on the circumference to be detected at any point along the circumference. Accordingly, this may be referenced to the stamping surface that is currently stamping. The identifying features are normally arranged in a manner distributed continuously in the circumferential direction of the stamping wheels, with the result that knowledge of the location of at least one identifying feature, for example a digit 0 . . . 9, along the circumference allows the digit that is currently being or intended to be embossed onto the component to be inferred.

The detection device may further comprise at least one eddy current sensor arranged in a portion of the apparatus that accommodates the component. According to this configuration, the identifying information is not determined with respect to the apparatus itself, but rather it is possible for the identifying information applied to the component to be determined directly in the component itself. With respect to the arrangement described above, the arrangement in the portion of the apparatus that accommodates the component of the apparatus may also be understood as the "lower tool half", in particular with respect to a stamping device that stamps the identifying information into the component from above.

The detection device may be in particular designed to detect a component change that is characteristic of the identifying information and distinguishable from other identifying information. As described above, the basic function of the eddy current measurement is to detect changes in material on the basis of changes in a signal induced in the component. In other words, the component is brought into contact with an appropriate eddy current sensor, there being a resultant change in material in this region depending on what identifying information has been stamped into the component. The reflection of an induced magnetic signal in the component and the change therein compared to a normal behavior may be used to ascertain what characteristic identifying information has been stamped into the component. This results in different signals from the eddy current measurement for different components into which different identifying information has been stamped. Finally, it permits the components to be characteristically distinguished from one another. Advantageously, it is possible for the identifying information to be recognizable even after an attempt to render it unidentifiable, for example overpainting or rubbing out the stamped-in identifying information. This therefore permits the relevant component to be associated or identified even after tampering.

The apparatus may further comprise a memory device, or a memory device may be associated with the apparatus, that is designed to store at least one piece of component information and to link the at least one piece of component information with the identifying information of the related component. As described above, the component information may ultimately relate to any information that is known or ascertained with respect to the specific component. In particular, the component information relates to the prior manufacturing process or to a future manufacturing process for the component. The component information may provide a statement about the material of the component, the batch and the like.

The memory device may be used to produce a link for the known data, in particular a link between the component information and the individual component, by detecting the identifying information. This permits the identifying information applied to the component to be used to fully associate the component with the component information thereof individually. In other words, the identifying information applied to the component may be used to retrieve the information available about the component. In particular, this allows information about prior process steps that were carried out separately from the present process step, with which the apparatus for marking the component is associated, to be retrieved, meaning that the component is fully tracked and traceable.

The apparatus may further comprise a power supply device, or may be connected to a power supply device, in particular an internal or external power supply device, that is used for operating the detection device. As described above, the apparatus for marking the component may be used for example in the form of a counter stamp. Such an apparatus is normally not electrified, since the identifying information is normally applied purely mechanically and the identifying information is not stored in connection with the component. For example, such a counter stamp comprises a plurality of stamping wheels that are mechanically advanced by one step in the serial number when the identifying information is applied. This does not normally require a power supply, since the apparatus itself is operated exclusively mechanically. Providing the power supply device can ensure that the detection device is able to be operated autonomously. There may be provision for an internal power supply device, for example in the form of a battery, that supplies the detection device with the required power. Similarly, it is possible to provide an external power supply device, which may be connected to a power supply device coupled for the purpose of operating the apparatus, for example.

In addition, the invention relates to a method for marking a component by applying readable identifying information, the identifying information comprising at least one identifying feature, in particular an identifying symbol, wherein identifying information applied or to be applied to a component by way of an apparatus, in particular an apparatus as described above, is detected on the basis of an eddy current measurement.

All of the advantages, details, embodiments and/or features that have been described with respect to the apparatus are fully transferable to the method.

The invention is explained on the basis of exemplary embodiments with reference to the figures. The figures are schematic representations.

BRIEF DESCRIPTION OF THE DRAWINGS

FIG. 1 shows a schematic diagram of an apparatus according to a first exemplary embodiment.

FIG. 2 shows a schematic diagram of an apparatus according to a second exemplary embodiment.

DETAILED DESCRIPTION OF THE DRAWINGS

FIG. 1 shows an apparatus 1 for marking a component 2 by applying readable identifying information. The identifying information comprises at least one identifying feature, in particular an identifying symbol. In other words, the apparatus 1 is designed to introduce information into the component 2. In the exemplary embodiment shown, the apparatus 1 is in the form of a counter stamp and comprises multiple stamping elements 3-7, which are in the form of stamping wheels.

In other words, each of the stamping elements 3-7 comprises a plurality of stamping surfaces 8 that are arranged on the outer surface of the stamping elements 3-7 in a manner distributed in the circumferential direction. By bringing the applicable stamping surfaces 8 into contact with the surface of the component 2, the identifying information may be stamped onto the surface of the component 2. It is therefore possible for the stamping surfaces 8 of the stamping elements 3-7 to be stamped onto the surface of the component 2, so that ultimately the identifying symbol that corresponds to, or is reproduced by, the respective stamping surface 8 is embossed onto the surface of the component 2. Since each stamping element 3-7 comprises a plurality of such identifying symbols, individual identifying information may be produced for each component 2. For example, each of the stamping elements 3-7 comprises the digits 0 to 9 as stamp symbols. Accordingly, ten stamping surfaces 8 are arranged on each of the stamping elements 3-7 in a manner distributed in the circumferential direction. By setting a specific configuration for the individual stamping elements 3-7, for example by rotating the individual stamping elements 3-7 about a shared axis of rotation, it is therefore possible to set an individual serial number that may be stamped onto the appropriate component 2.

The apparatus 1 further comprises a detection device 9 that, in this exemplary embodiment, provides multiple eddy current sensors 10-15. The eddy current sensors 10-15 are intended to be understood merely by way of illustration, however. It is naturally likewise possible to provide for a different number of eddy current sensors 10-15, or a different arrangement of the eddy current sensors 10-15 from the arrangement shown. The embodiments relating to the individual eddy current sensors 10-15 and the arrangement thereof should therefore be understood by way of illustration in order to explain the principle of operation of the apparatus 1, or the detection device 9 thereof.

The eddy current sensor 10 is arranged on the stamping elements 3-7 in such a way that it is able to detect the specific combination of stamping surfaces 8, in particular the identifying information connected to this specific configuration, through the individual stamping elements 3-7. Rotation of individual stamping elements 3-7 changes the signal that is able to be detected by the eddy current sensor 10. It is therefore ultimately possible to infer the individual combination of stamping surfaces 8, or stamp symbols, that are introduced into the surface of the component 2 by the individual stamping elements 3-7 on the basis of the signal that is able to be detected by the eddy current sensor 10.

Further, the apparatus 1 comprises a memory device 16 that is designed to detect the applicable signals from the eddy current sensor 10, or from the eddy current sensors 10-15. The memory device 16 may further be used to store further data for the component 2, or for all of the components 2, and to link the data with the identifying information embossed or applied. In particular, it is possible to store component information for the component 2, such as for example data about the manufacturing process, the material, the batch and the like, and to link the information with the identifying information, that is to say ultimately the serial number. The identifying information may subsequently be used to ascertain exactly which component 2 is involved, and the component information of the component 2 may be retrieved on the basis of the identifying information.

The other eddy current sensors 11-15 show that it is likewise possible to perform the detection for the stamping elements 3-7 individually. In the representation shown, the eddy current sensors 11-15 are arranged at an angle with respect to the stamping surfaces 8 that currently introduce identifying features into the surface of the component 2. In light of the distribution of the individual identifying symbols in the circumferential direction of the stamping elements 3-7, the stamping surfaces 8 facing the eddy current sensors 11-15 may be detected by detecting one particular arbitrary stamping surface 8 per stamping element 3-7. As may be seen, this allows detection of what identifying information is currently being stamped into the component 2. The signals from the eddy current sensors 11-15 may naturally also be stored in the memory device 16.

FIG. 2 shows an alternative embodiment of the apparatus 1, the same reference signs being used for the same components in principle. The apparatus 1 shown in FIG. 2 likewise has five stamping elements 3-7, the circumference of which has multiple stamping surfaces 8 arranged on it. As in FIG. 1 too, the individual stamping surfaces 8 of each stamping element 3-7 are equipped with different identifying symbols, or cause different identifying symbols to be stamped into the component 2. The apparatus 1 in FIG. 2 likewise has an associated detection device 9 that comprises an eddy current sensor 17. In this exemplary embodiment, the eddy current sensor 17 is associated with the tool half that also carries the stamping elements 3-7. After the identifying information has been applied, the eddy current sensor 17 is capable, when the tool is opened, that is to say when the stamping elements 3-7 and the component 2 are physically moved apart from one another, of detecting the identifying information introduced into, or applied to, the component 2. The eddy current sensor 17 detects changes in the material structure in the surface of the component 2, which means that identification of the component 2 is possible on the basis of the measurement signal from the eddy current sensor 17.

Further, FIG. 2 additionally shows an eddy current sensor 18 that is arranged in the "lower tool half" and is therefore designed to survey the component 2 directly. This allows the identifying information introduced into, or applied to, the component 2 to be detected after the identifying information has been applied. As described above, the eddy current sensor 18 is able to induce an applicable measurement signal into the component 2, detection of the identifying information being possible on the basis of a signal reflected in the component 2. As likewise described above, the applicable signals from the eddy current sensors 17, 18 may be stored in the memory device 16. It is likewise possible for the signals, which ultimately shed light on the identifying information of the respective component 2, to be linked with the applicable component information for the component 2.

The method described above may naturally be carried out on the apparatus 1. All of the advantages, details and features shown in FIGS. 1 and 2 may naturally be combined with one another, interchanged or transferred as desired.

| List of reference signs | |
| --- | --- |
| 1 | apparatus |
| 2 | component |
| 3-7 | stamping element |
| 8 | stamping surface |
| 9 | detection device |
| 10-15 | eddy current sensor |
| 16 | memory device |
| 17, 18 | eddy current sensor |

What is claimed is:

1. An apparatus for marking a component by applying readable identifying information, the identifying information comprising at least one identifying feature, the apparatus comprising:
   a detection device that is configured to detect, based on an eddy current measurement, the identifying information applied or to be applied to a component by way of the apparatus, wherein:
   the detection device comprises at least one eddy current sensor arranged in a portion of the apparatus that comprises at least one stamping device,
   the at least one stamping device comprises at least two stamping elements, and
   the detection device is configured to detect information relating to a stamp symbol to be stamped into the component by way of the at least two stamping elements.

2. The apparatus according to claim 1, wherein the at least one identifying feature is an identifying symbol.

3. The apparatus according to claim 1, wherein the apparatus is configured to apply the identifying information by way of the at least one stamping device or by way of a beam of energy.

4. The apparatus according to claim 1, wherein the at least two stamping elements are stamping wheels that are rotatable about an axis of rotation into multiple positions.

5. The apparatus according to claim 4, wherein the information is a position or an orientation of the stamping wheels.

6. The apparatus according to claim 1, wherein the at least one eddy current sensor is associated with the at least two stamping elements and/or in that at least two different eddy current sensors are associated with the at least two different stamping elements.

7. The apparatus according to claim 1, further comprising a memory device that is configured to store at least one piece of component information and to link the at least one piece of component information with identifying information of an associated component.

8. The apparatus according to claim 1, further comprising a power supply device for operating the detection device.

9. The apparatus according to claim 8, wherein the power supply device is an internal or an external power supply device.

\* \* \* \* \*